L. J. HOLLINGWORTH & J. REUTER.
ROLLER BEARING.
APPLICATION FILED OCT. 27, 1909.
987,138.
Patented Mar. 21, 1911.
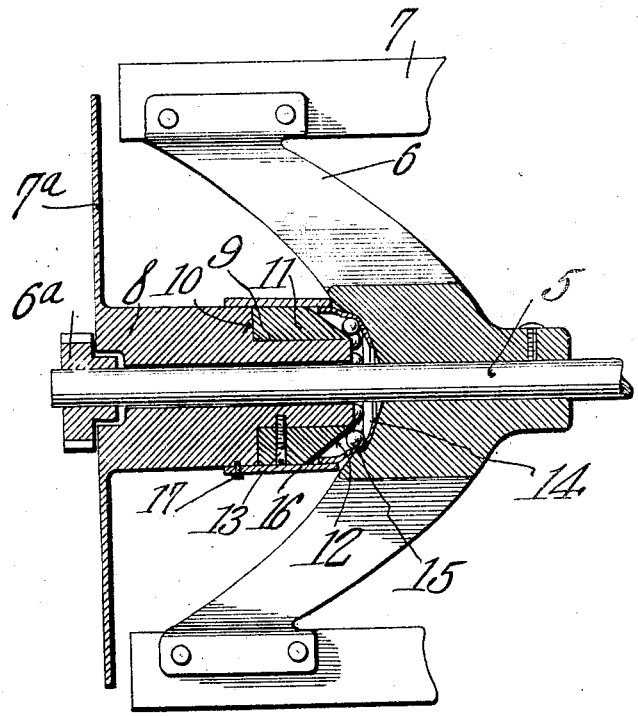
Inventor
Leonard J. Hollingworth and
Jacob Reuter
Witnesses
By C. A. Snow & Co.
Attorneys

UNITED STATES PATENT OFFICE.

LEONARD J. HOLLINGWORTH AND JACOB REUTER, OF HUTCHINSON, KANSAS.

ROLLER-BEARING.

987,138.

Specification of Letters Patent.  Patented Mar. 21, 1911.

Application filed October 27, 1909. Serial No. 524,915.

*To all whom it may concern:*

Be it known that we, LEONARD J. HOLLINGWORTH and JACOB REUTER, citizens of the United States, residing at Hutchinson, in the county of Reno, State of Kansas, have invented new and useful Roller-Bearings, of which the following is a specification.

The invention aims to provide an improved construction of bearing designed particularly for the knife heads or hubs of a lawn mower which bearing will be so protected as to prevent entrance of particles of dirt and grit between the coöperating faces of the bearing elements.

With the above and other objects in view, the invention consists in the construction and arrangement of parts shown in the accompanying drawings, in which the figure is a vertical longitudinal sectional view through one end of a lawn mower showing the parts of the bearing.

In the drawings, the shaft upon which the knife heads or hubs are mounted is indicated by the numeral 5 and upon the shaft at one end there is fixed a pinion 6ª which meshes with a driving gear (not shown). The pinion and the gear above mentioned are incased in a housing or casing of which one head or side is shown in the drawings and is indicated by the numeral 7ª, this being the side or head next to the cutting element of the mower. Integral with this head and concentric with respect to the body portion thereof, is a sleeve 8 which projects inwardly and receives the shaft 5 for rotation. For a purpose which will be presently explained, the sleeve 8 has its inner end reduced as at 9 whereby to afford a shoulder 10 and fitted removably upon the reduced inner end 9 of the sleeve is a bearing cone 11, one end of which abuts against the shoulder 10 and the other end of which is peripherally beveled as at 12 to afford a bearing face. This bearing cone 11 may either be threaded upon the reduced end of the sleeve or may be held thereon, as illustrated in the present instance, by a set screw 13.

Only one of the knife heads or hubs of the mower is illustrated in the drawings, and integral with the head are the knife carrying arms 6 which support at their outer ends the knives 7. It will be observed from an inspection of the drawings that the arms 6 project not only radially from but also outwardly from the hubs or heads and have their outer ends positioned very close to the head or side 7ª of the casing heretofore mentioned. It will be understood of course that two of the heads or hubs are fixed upon the shaft 5 and that the knives 7 extend between the arms of these heads or hubs and are in this manner supported for movement about the shaft 5 as an axis.

As is clearly shown in the drawings, the outer end of the hub is formed with a concavity in which is disposed a ball race which is indicated by the numeral 14 and in which are disposed bearing balls 15. When the hub is properly fixed upon the shaft 5, the beveled bearing face 12 of the bearing cone 11 will project into the ball race 14 and coöperate with the bearing balls 15 therein, in the usual manner.

It will be observed from the drawings that the ball race 14, which is preferably of pressed steel, is held in place in the concavity in the outer end of the hub by the projection of the inner end of the sleeve 8 thereinto and the bearing of the end of this sleeve against the bearing balls 15.

It will also be understood that should end thrust occur, which is extremely likely in a machine of this class, there will be but very little friction between the coöperating bearing parts or elements.

It will also be understood in connection with the foregoing description and with the showing of the drawing that inasmuch as the sleeve 8 is stationary and the end portions of the shaft 5 which project beyond the outer ends of the hubs are completely inclosed, no rotating parts will be exposed at the ends of the cutter head such as would be liable to become clogged by grass wrapping thereabout.

It is preferable that means be provided for positively preventing the entrance of particles of dirt or grit into the ball race 14 and to this end, a sleeve 16 is fitted upon the bearing cone 11 and when the parts are properly assembled, projects at its inner end over and circumscribes the outer peripheral edge of the ball race 14 as is clearly shown in Fig. 1 of the drawings, the sleeve being held in this position by a set screw 17. More specifically speaking, the sleeve 16 fits telescopically over the outer end of the ball race 14 and prevents the entrance of particles of dirt and grit into the race as will be readily understood.

What is claimed is:—

In a machine of the class described, a shaft, a casing head having a sleeve extension loosely receiving the shaft, a hub upon the shaft and formed in that end which is presented toward the casing head with a concavity, the said casing head being formed with a sleeve fitting upon the shaft and projecting into the concavity of the hub, a ball race fitted into the concavity of the hub and of an exterior diameter equal substantially to the exterior diameter of the sleeve, the said sleeve at that end which is presented toward the hub being reduced circumferentially, a bearing cone fitted upon the said reduced portion of the sleeve and rigidly held thereon, bearing balls fitted in the ball race and between the same and the said cone, and a sleeve fitted upon the first mentioned sleeve and fitting over and completely inclosing the bearing cone, said last mentioned sleeve projecting telescopically over the outer portion of the said ball race and closing the space between this portion of the ball race and the bearing cone.

In testimony that we claim the foregoing as our own, we have hereto affixed our signatures in the presence of two witnesses.

LEONARD J. HOLLINGWORTH.
JACOB REUTER.

Witnesses:
GEO. S. TIFFANY,
CHAS. SELDEN.